Sept. 1, 1970
T. STEEL
3,526,092
GAS TURBINE ENGINE HAVING IMPROVED BEARING
SUPPORT MEANS FOR CONCENTRIC SHAFTS
Filed Aug. 21, 1968
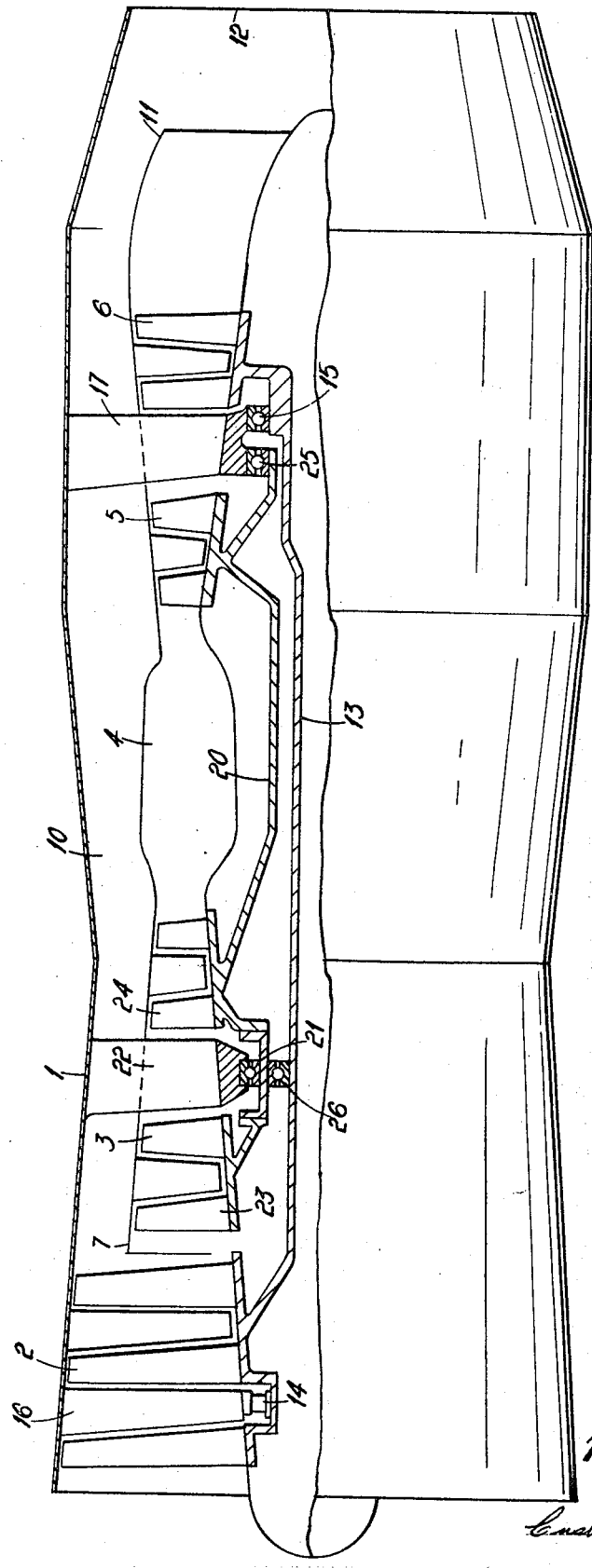
Inventor
THOMAS STEEL
By Cushman, Darby y Cushman
Attorney

3,526,092
GAS TURBINE ENGINE HAVING IMPROVED BEARING SUPPORT MEANS FOR CONCENTRIC SHAFTS

Thomas Steel, Littleover, Derby, England, assignor to Rolls-Royce Limited, Derby, England, a British company
Filed Aug. 21, 1968, Ser. No. 754,190
Claims priority, application Great Britain, Sept. 15, 1967, 42,226/67
Int. Cl. F02c 7/02, 7/06
U.S. Cl. 60—39.16      4 Claims

ABSTRACT OF THE DISCLOSURE

A gas turbine engine has a low pressure shaft on which a low pressure compressor and a low pressure turbine are mounted and a high pressure shaft on which a high pressure compressor and a high pressure turbine are mounted, and shaft bearings which are arranged respectively upstream and downstream of the engine combustion equipment, the high pressure shaft having its upstream bearing arranged downstream of its upstream end and having its downstream bearing arranged downstream of a rotor of the high pressure turbine, the high pressure shaft being unsupported between its upstream and downstream bearings; an intershaft bearing being disposed between the high and low pressure shafts, the intershaft bearing being aligned with the upstream bearing of the high pressure shaft.

---

This invention concerns a gas turbine engine.

According to the present invention, there is provided a gas turbine engine having an engine casing within which there are arranged in flow series a low pressure compressor, a high pressure compressor, combustion equipment, a high pressure turbine and a low pressure turbine; a low pressure shaft on which the low pressure compressor and low pressure turbine are mounted; a high pressure shaft on which the high pressure compressor and high pressure turbine are mounted, the high pressure shaft being mounted concentrically about the low pressure shaft, bearings arranged respectively upstream and downstream of the combustion equipment, and by means of which the two shafts are rotatably supported from the engine casing, having its upstream bearing arranged downstream of its upstream end and having its downstream bearing arranged downstream of a rotor of the high pressure turbine, the high pressure shaft being unsupported between its upstream and downstream bearings; an intershaft bearing being disposed between the high and low pressure shafts, the intershaft bearing being aligned with the upstream bearing of the high pressure shaft.

By reason of the upstream bearing of the high pressure shaft being arranged downstream of the upstream end thereof, the said bearing is closer to the downstream bearing of the high pressure shaft than would otherwise be the case, thereby enabling the high pressure shaft to be unsupported between its upstream and downstream bearings. Since it is so unsupported, there will be no bearing for the high pressure shaft in the region of the combustion equipment of the engine and this is highly desirable, since it is difficult to provide satisfactory lubrication to such a bearing and to protect it from overheating.

The high pressure compressor is therefore preferably split into two portions which are respectively arranged upstream and downstream of the upstream bearing of the high pressure shaft.

The downstream bearings of the high and low pressure shafts may be disposed adjacent to each other and may be supported from the engine casing by common structure.

The engine may be a by-pass engine having a by-pass passage which is arranged to receive part of the air compressed by the low pressure compressor of the engine.

Preferably, the upstream and downstream bladed portions of the high pressure compressor are of approximately equal axial extent.

The invention is illustrated, merely by way of example, in the accompanying drawing, which is a diagrammatic view, partly in section of a gas turbine engine according to the present invention.

Referring to the drawing, a gas turbine by-pass engine has an engine casing 1 within which there are arranged in flow series a low pressure compressor 2, a high pressure compressor 3, combustion equipment 4, a high pressure turbine 5 and a low pressure turbine 6.

The high pressure compressor 3, the combustion equipment 4, the high pressure turbine 5, and the low pressure turbine 6 are mounted within an inner casing 7 which is spaced from the engine casing 1 by a by-pass passage 10 which is arranged to receive part of the air compressed by the low pressure compressor 2. The downstream end 11 of the inner casing 7 is arranged upstream of the downstream end 12 of the engine casing 1 so that mixing will occur of the by-pass air and turbine exhaust gases before they leave the engine through the downstream end 12.

The low pressure compressor 2 and the low pressure turbine 6 are mounted on a low pressure shaft 13 which is totatably supported from the engine casing 1 in an upstream bearing 14 and a downstream bearing 15. The upstream bearing 14 is supported from the engine casing 1 by vane structure 16, while the downstream bearing 15 is supported from the engine casing 1 by vane structure 17. As will be seen from the drawing, the vane structure 17 is disposed between the high pressure turbine 5 and the low pressure turbine 6.

The high pressure compressor 3 and the high pressure turbine 5 are mounted on a high pressure shaft 20 which is itself mounted concentrically about the low pressure shaft 13.

The high pressure shaft 20 is rotatably mounted in an upstream bearing 21 which is supported from the engine casing 1 by vane structure 22. The vane structures 17, 22, in addition to supporting the bearings 15, 21 respectively, also serve to support the inner casing 7 from the engine casing 1.

The high pressure compressor 3 is split into two portions 23, 24 which are respectively arranged upstream and downstream of the upstream bearing 21. The high pressure shaft 20 is also rotatably mounted in a downstream bearing 25 which is supported from the engine casing 1 by the vane structure 17, the bearings 15, 25 being disposed adacent to each other.

The upstream bearing 21 is, in conventional engines, disposed at the upstream end of the high pressure shaft 20 and is therefore so distant from the downstream bearing 25 as to require the provision of an intershaft bearing between the shafts 13 and 20, this intershaft bearing disposed radially inwardly of the combustion equipment 4. Such an intershaft bearing disposed radially inwardly of the combustion equipment 4, however, is so placed that it is difficult to lubricate it satisfactorily, and it is also difficult to insulate it satisfactorily from the heat of the combustion equipment. However, by reason of the fact that the bearing 21 is arranged downstream of the upstream end of the high pressure compressor 3, it is thereby disposed nearer to the downstream bearing 25, with the result that the provision of an intershaft bearing in the region of the combustion equipment 4 is not needed. The high pressure shaft 20 is therefore unsupported between its upstream and downstream bearings 21, 25.

An intershaft bearing 26 is provided between the high pressure shaft 20 and the low pressure shaft 13, but this particular intershaft bearing 26 is aligned with the upstream bearing 21 and is thus not disposed in the region of the combustion equipment 4.

Since the bearing 21 is disposed substantially mid-way along the length of the high pressure compressor 3, better control is achieved of the deflection or "whirl" of the high pressure compressor about its axis, and thus it is easier to maintain the blade tip clearances at the downstream end of the high pressure compressor.

The splitting of the high pressure compressor 3 into two portions 23, 24 enables these portions to be made of different metals if desired. The splitting of the high pressure compressor also provides a convenient region, i.e. the region adjacent the bearing 21, from which air can be bled so as to give compressor control, e.g. to avoid surging. Thus the air may be bled directly into the by-pass passage 10 by way of equipment (ont shown) which may be placed between the portions 23, 24.

I claim:
1. A gas turbine engine comprising:
an engine casing; a low pressure compressor, a high pressure compressor having an upstream bladed portion and a downstream bladed portion, combustion equipment, a high pressure turbine having a bladed rotor and a low pressure turbine, all arranged in flow series within said casing; a low pressure shaft on which said low pressure compressor and said low pressure turbine are mounted; a high pressure shaft on which said high pressure compressor and said high pressure turbine are mounted, said high pressure shaft being mounted concentrically about said low pressure shaft; an upstream bearing and a downstream bearing arranged respectively upstream and downstream of the combustion equipment and rotatably supporting said low pressure shaft from said engine casing; an upstream bearing arranged downstream of the upstream end of said high pressure shaft and upstream of said combustion equipment and a downstream bearing arranged downstream of said combustion equipment and downstream of the bladed rotor of said high pressure turbine, said last mentioned upstream bearing and downstream bearing rotatably supporting said high pressure shaft from said engine casing, with the same being unsupported therebetween; support structure from said engine casing and extending between said upstream and downstream bladed portions of said high pressure compressor for supporting the upstream bearing of said high pressure shaft; and an intershaft bearing disposed between said high pressure shaft and said low pressure shaft, said intershaft bearing being aligned with the uptream bearing of said high pressure shaft.

2. A gas turbine engine as claimed in claim 1, in which the upstream and downstream bladed portions of said high pressure compressor are of approximately equal axial extent.

3. An engine as claimed in claim 1 in which the downstream bearings of the high and low pressure shafts are disposed adjacent to each other, common structure supporting the downstream bearings from the engine casing.

4. An engine as claimed in claim 1 in which the engine is a by-pass engine having a by-pass passage which is arranged to receive part of the air compressed by the low pressure compressor of the engine.

References Cited

UNITED STATES PATENTS

| 2,931,173 | 4/1960 | Schapker | 230—123 XR |
| 3,313,105 | 4/1967 | Johnson | 60—39.31 XR |
| 3,453,825 | 7/1969 | May et al. | 60—39.16 XR |

FOREIGN PATENTS 718,827  11/1954  Great Britain.

CARLTON R. CROYLE, Primary Examiner

U.S. Cl. X.R.

60—39.31; 230—116, 122